Figure 1:
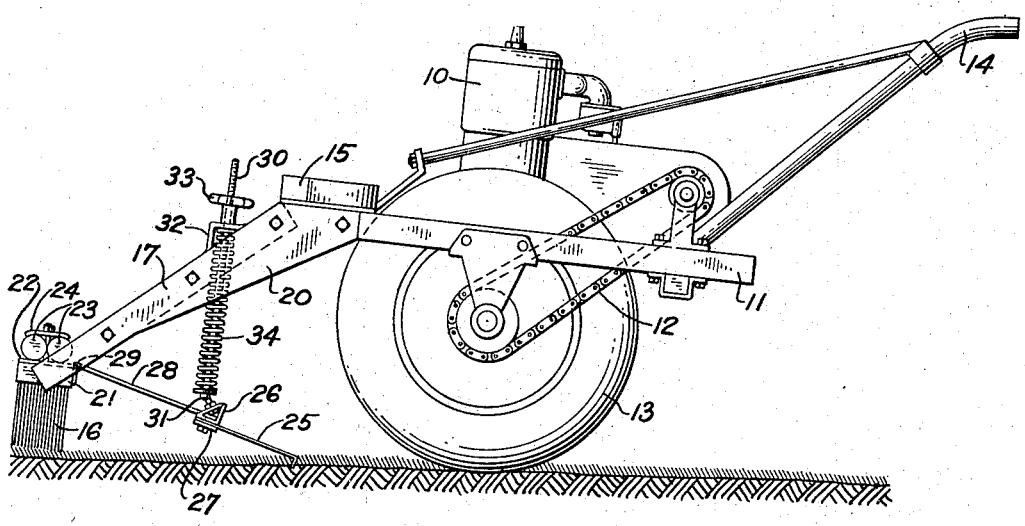

Dec. 30, 1941.　　　D. GORMLEY ET AL　　　2,268,250
BRUSH AND RAKE UNIT FOR GOLF GREENS
Filed Oct. 6, 1939　　　2 Sheets-Sheet 1

INVENTORS.
DAN GORMLEY
LAWRENCE J. MAZZEI
HENRY F. HATHORNE
BY Jas. M. Naylor
ATTORNEY.

Dec. 30, 1941.  D. GORMLEY ET AL  2,268,250
BRUSH AND RAKE UNIT FOR GOLF GREENS
Filed Oct. 6, 1939  2 Sheets-Sheet 2
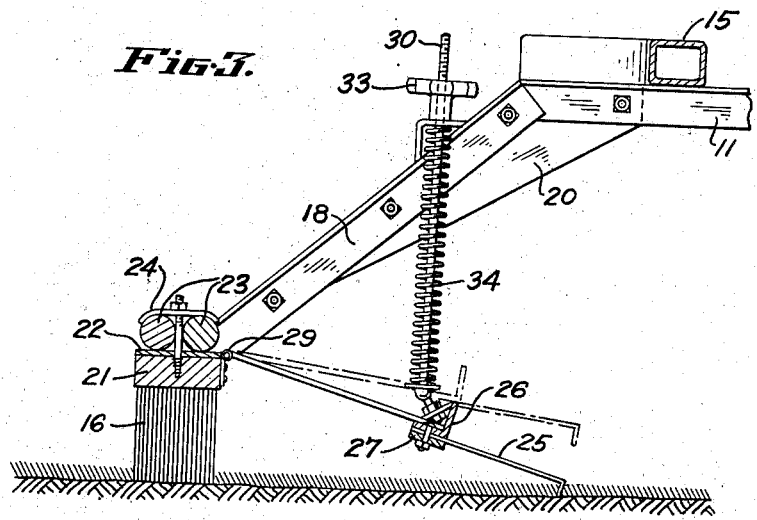
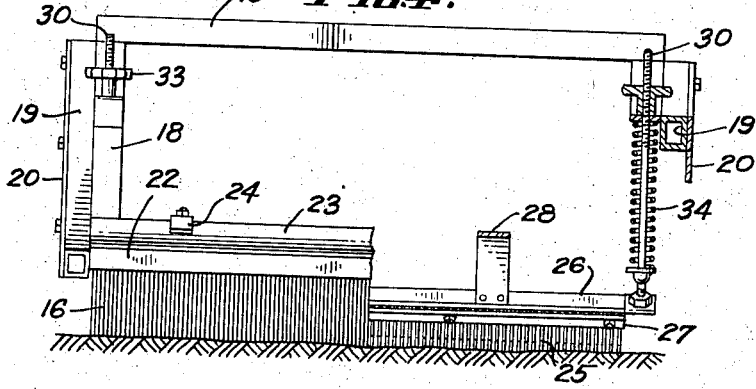
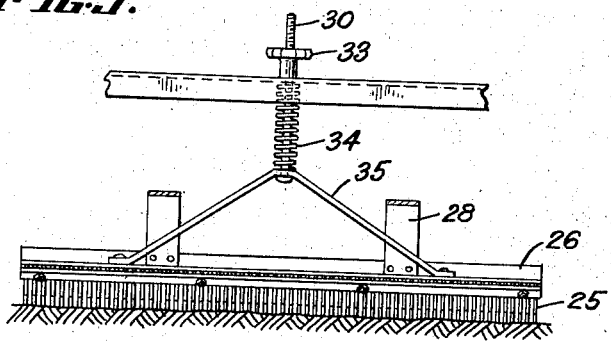
INVENTORS.
DAN GORMLEY
LAWRENCE J. MAZZEI
HENRY F. HATHORNE
BY Jas. M. Naylor
ATTORNEY Patented Dec. 30, 1941

2,268,250

UNITED STATES PATENT OFFICE 2,268,250

BRUSH AND RAKE UNIT FOR GOLF GREENS

Dan Gormley, San Francisco, and Henry F. Hathorne and Lawrence J. Mazzei, San Bruno, Calif., assignors of one-fourth to said Gormley, one-fourth to said Hathorne, one-fourth to said Mazzei, and one-fourth to N. T. McKee, Colma, Calif.

Application October 6, 1939, Serial No. 298,250

8 Claims. (Cl. 56—400.14)

This invention relates to a brush and rake unit for golf greens and like turf.

The invention has for one of its objects the provision of an efficient means for the care and maintenance of golf greens and like turfs. It is an object of this invention to provide a brush and rake unit wherein the two elements may be used together or separately and to include therein simplified means whereby the device may be quickly converted for its several uses.

In the care and maintenance of golf greens and like turfs it is necessary to give them considerable treatment beyond mere mowing. For instance, as the turf becomes matted it is necessary to thin the grass out to aerate the roots and preserve the smooth surface. Additionally, it is found necessary to brush the greens. Then again it is necessary from time to time to apply what is known as "top dressing" to the turf and this must be raked, brushed or manipulated in some way to spread it evenly in the grass so as not to interfere with the normal use to which the turf is put. In the care of golf greens the above noted steps must be taken frequently and regularly because it is essential that evenness of texture and grain must be at all times maintained.

It has been the practice, until the advent of this invention, to manually rake and brush the golf greens for the purposes above stated. While the workmen assigned to these tasks acquire considerable skill, it will be readily appreciated that it is an extremely tedious job and, furthermore, the results are not uniform.

In general terms, the objects of this invention are attained by providing a brush and rake unit which may be conveniently attached to any of the small power units employed in the care and maintenance of grass plots, golf greens and the like, to the end that any raking or brushing job incidental to the treatment of the turf thereof may be done more thoroughly, more quickly and at considerably less cost. Our invention contemplates the use of a brush maintained in fixed relation to the frame of the power unit and a rake element which is adjustable to three positions for separate or combined use with the brush.

These and other objects of our invention will become more apparent as this specification proceeds.

Figure 2:
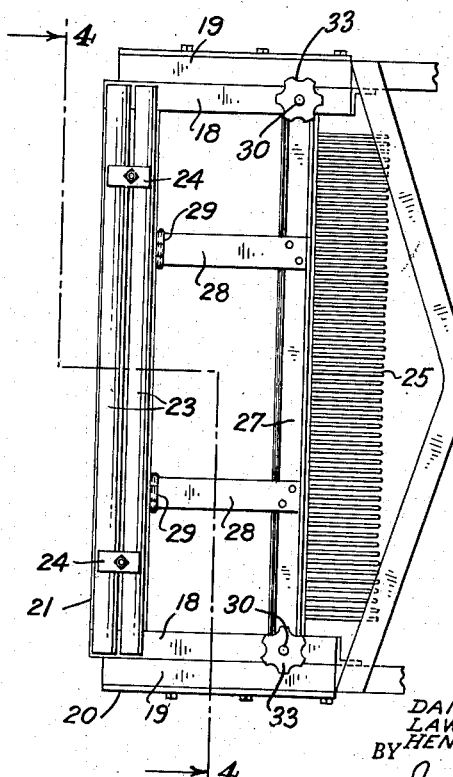

In the drawings forming a part hereof:

Fig. 1 is a side elevation of a conventional power unit to which the subject-matter of this invention is shown attached, Fig. 2 is a top plan view of our brush and rake unit, Fig. 3 is a vertical section through our device showing two of the three positions to which the rake element may be adjusted, Fig. 4 is a front elevation, partly in section, of our device, taken along the line 4—4 of Fig. 2, and Fig. 5 is a front elevation of a modification of the rake adjustment means.

As above stated, the device of our invention is adapted to be attached to any of the well-known and commonly used small horse power units now commercially available to drive grass mowers, sickles and the like. That illustrated as an example comprises a motor 10, mounted on a frame 11, a chain drive 12, the driven wheels 13 and a pair of handle bars 14 for maneuvering the unit. It will be appreciated as this specification proceeds that our brush and rake attachment may be utilized in conjunction with any like power unit.

As will be noted from Figs. 1 and 3, the ends of the frame 11 of the power unit project forwardly of the wheels 13, and are connected by the curved cross-bar or spanner 15. The brush 16 is supported between the ends of a pair of frame members 17 rigidly connected at their opposite ends to the power unit frame 11. These auxiliary frames 17 project downwardly from frame 11 to support the brush 16 in a turf engaging position (see Figs. 1 and 3), and comprise angle irons 18 and the hollow bar members 19, bolted or otherwise secured together. The angle irons 18 terminate short of the point of connection of members 19 to frame 11 and the latter connection is effected in known manner, such as by welding. Additionally, the connection between members 19 and frame 11 is reinforced by the provision of the plates 20 spannning these elements and secured thereto, as by bolting. While in the illustrated form the device of our invention is shown permanently attached to the frame of the power unit, it will be understood that this is not essential, since if built as a detachable unit the device will function satisfactorily provided the connecting means employed will furnish the required rigidity.

The brush 16 is provided with a conventional back 21 on the top of which there is supported a longitudinally extending plate 22, the projecting ends of which are attached to the lower ends of angle irons 18 and members 19. A balance weight, here shown in the form of rods 23, is supported by the plate 22 and retained thereon by the clamps 24 bolted to the back 21 of brush 16.

It will be appreciated from the foregoing that the brush 16 becomes a rigidly connected part of the power unit and that by balancing with the handle bars 14 the brush may be maintained in a turf engaging position or raised therefrom as desired.

The rake element consists in a plurality of teeth 25 clamped between the angle iron 26 and the strap 27 which are bolted together. The support for the rake 25 consists in a pair of drag bars 28 having hinged connections 29 to the brush back 20 and the vertical adjustment means about to be described.

Adjustment of the rake to any one of the three positions indicated in Figs. 1 and 3 is accomplished by vertical movement of the rods 30 disposed on opposite sides of the unit (Fig. 2). Each of these rods has a ball and socket or other type universal joint connection 31 with the angle iron 26 forming a part of the mount for the rake 25. The upper ends of the rods 30 project through the angle irons 18 and the brackets 32 thereon and are threaded to engage the adjustment nuts 33. Each of the rods 30 is provided with a coil spring 34 disposed thereon between the bracket 32 and the universal joint 31.

Adjustment of the rake in the position shown in dotted lines in Fig. 3, that is to say, out of engagement with the turf, is accomplished by turning the adjustment nut 33 to raise the rod 30 and compressing the spring 34. Lowering the rake into the turf engaging positions illustrated in Figs. 3 and 1 is accomplished by unscrewing the nut 33 to permit coil spring 34 to expand pushing the rake 25 downwardly.

In Fig. 5 there is shown a modification of the rake adjustment means in the form of a single medially disposed rod 30. In this instance the rod is connected at its lower end to the rake frame member 26 by means of an A-shaped bracket 35. The upper end of the rod projects through a horizontal frame member 36, which in turn is connected to frame 11 (not shown) and is threaded for engagement with the adjustment nut 33. Being provided with a coil spring 34, between frame member 36 and bracket 35, vertical movement of the rod 30 to effect adjustment of the position of the rake 25 is effected by turning the adjustment nut 33. Thus the adjustment of the position of rake 25 can be more quickly made.

It will be appreciated that while we have shown the adjustment of the rake as being effected by the movement of the rod 30, the adjustment can be effected by a number of other means. For example, the adjustment could be made by means of a latch mechanism movable into three fixed positions to shift the rake 25 in relation to the brush 16. Hence, the form of adjustment shown is to be regarded as illustrative only.

The operation of our device is as follows: If it be desired to brush the turf, the rake 25 is adjusted to the position shown in dotted lines in Fig. 3. If it be desired to simultaneously brush and rake the turf, the rake is adjusted into the turf engaging position shown in Fig. 3. When the turf is to be raked only, the rake is adjusted to the position shown in Fig. 1, that is lower than the brush 16. Here the bristles of brush 16 merely graze the top blades of the turf and striking a balance with the handle bars 14 the operator is able to relieve the tension on the rake 25 and maintain the brush 16 clear of the green.

It will also be appreciated that our invention may take many forms in addition to that shown and described and therefore we desire full protection in accordance with the appended claims.

The invention claimed is:

1. A turf brush and rake attachment for a self-propelled wheeled vehicle having a frame and handle bars affixed at the rear end thereof, comprising: a downwardly projecting auxiliary frame connected to the main vehicle frame, a turf brush rigidly connected to the forward end of the auxiliary frame, a rake hingedly connected to said brush and extending rearwardly therefrom, a rod connected at its lower end for universal movement with said rake, the upper end of said rod projecting through said auxiliary frame and being threaded, an adjustment nut engaging the projected threaded portion of said rod, and a coil spring on said rod between said auxiliary frame and said connection with said rake.

2. A turf brush and rake attachment for a self-propelled wheeled vehicle having a frame and handle bars affixed at the rear end thereof, comprising: a downwardly projecting auxiliary frame connected to the vehicle frame, a turf brush rigidly connected to the forward end of the auxiliary frame, a rake hingedly connected to said brush and projecting rearwardly therefrom, and a connection between the auxiliary frame and the rake operable to swing the rake about its pivotal connection to said brush.

3. A turf brush and rake attachment for a self-propelled wheeled vehicle having a frame and handle bars affixed at the rear end thereof, comprising: a downwardly projecting auxiliary frame connected to the main vehicle frame, a turf brush supported at the forward end of the auxiliary frame, a rake disposed behind said brush and under said auxiliary frame and supported for pivotal movement in relation to said brush, and a connection between the auxiliary frame and said rake operable to swing said rake about its pivotal support.

4. A turf brush and rake attachment for a wheeled vehicle having a frame, comprising: a downwardly projecting auxiliary frame connected to the vehicle frame, a brush supported at the lower end of the auxiliary frame, a rake hingedly connected to said brush, said rake having a connection with said auxiliary frame operable to swing the rake about its hinged connection with said brush.

5. A turf brush and rake attachment for a self-propelled wheeled vehicle having a frame and handle bars affixed at the rear end thereof, comprising: a downwardly projecting auxiliary frame connected to the vehicle frame, a brush rigidly attached to the lower end of the auxiliary frame, said brush being movable into and from turf engaging positions upon manipulation of said handle bars, a rake hingedly connected to said brush, and a connection between the rake and the auxiliary frame operable to swing the rake about its hinged connection to said brush.

6. A machine of the character described comprising in combination, a wheeled vehicle, driving means therefor, a frame member on the vehicle, handle bars attached to the rear end of the frame, a downwardly projecting auxiliary frame member rigidly attached to the forward end of the main frame, a brush supported at the end of the auxiliary frame, a rake hingedly connected to the brush, and a connection between the rake and said auxiliary frame operable to swing the rake about its hinged connection to the brush.

7. A turf brush and rake attachment for a wheeled vehicle having a frame, comprising: a downwardly projecting auxiliary frame connected to the vehicle frame, a brush supported at the lower end of the auxiliary frame, a rake hingedly connected to said brush, and a connection between said auxiliary frame and said rake operable to move said rake from inoperative position to operative position with said brush and to operative position wherein said brush is rendered inoperative.

8. A turf brush and rake attachment for a wheeled vehicle having a frame, comprising: a downwardly projecting auxiliary frame connected to the vehicle frame, a brush supported at the lower end of the auxiliary frame, a rake, and a connection between said auxiliary frame and said rake operable to move said rake from inoperative to operative position with said brush and to operative position wherein said brush is rendered inoperative.

DAN GORMLEY.
HENRY F. HATHORNE.
LAWRENCE J. MAZZEI.